(12) United States Patent
Wang et al.

(10) Patent No.: US 7,348,385 B2
(45) Date of Patent: Mar. 25, 2008

(54) ACRYLATE/METHACRYLATE ADHESIVES INITIATED BY CHLOROSULFONATED POLYMER

(75) Inventors: Xiaobin Wang, North Andover, MA (US); Daniel K. Doe, Hyde Park, MA (US); Patricia M. Savory, Danvers, MA (US); Gary R. Hovan, Newbury, MA (US)

(73) Assignee: Illinois Tool Works Inc., Glenview, IL (US)

( * ) Notice: Subject to any disclaimer, the term of this patent is extended or adjusted under 35 U.S.C. 154(b) by 209 days.

(21) Appl. No.: 11/077,249

(22) Filed: Mar. 9, 2005

(65) Prior Publication Data

US 2006/0205850 A1    Sep. 14, 2006

(51) Int. Cl.
*C08F 4/44* (2006.01)

(52) U.S. Cl. ............... 526/160; 526/287; 526/352; 526/319

(58) Field of Classification Search ........ 526/160, 526/287, 319, 352
See application file for complete search history.

(56) References Cited

U.S. PATENT DOCUMENTS

| | | |
|---|---|---|
| 4,536,546 A | 8/1985 | Briggs |
| 4,714,730 A | 12/1987 | Briggs |
| 4,773,957 A | 9/1988 | Briggs |
| 4,942,201 A | 7/1990 | Briggs et al. |
| 4,959,405 A | 9/1990 | Briggs et al. |
| 5,112,691 A | 5/1992 | Briggs et al. |
| 5,206,288 A * | 4/1993 | Gosiewski et al. ........... 525/83 |
| 5,656,345 A | 8/1997 | Strand et al. |
| 6,001,904 A * | 12/1999 | Matzinger et al. ............ 524/31 |
| 6,462,126 B1 | 10/2002 | Gosiewski et al. |
| 6,512,043 B2 | 1/2003 | Wang et al. |
| 2004/0229990 A1 | 11/2004 | Righettini et al. |

OTHER PUBLICATIONS

George Odian, Principles of Polymerization, Third Edition, 1991, pp. 262-263, Wiley Interscience.
Sugerman G, et al. "Coupling Agents Enhance Anticorrosion Properties in Water-Bornes and High-Solids"; Modern Paint and Coatings; Palmerton; Atlanta, US; vol. 80, No. 3; 1990; pp. 42-46.

* cited by examiner

*Primary Examiner*—Robert D. Harlan
(74) *Attorney, Agent, or Firm*—Fletcher Yoder

(57) ABSTRACT

An adhesive formulation including an acrylate monomer and/or a methacrylate monomer, a chlorosulfonated polymer resin, and a reducing agent. The adhesive also includes a cycloheteroatom zirconate or a cycloheteroatom titannate, which is utilized as a cure profile regulator. Further, the adhesive includes toughening-agent copolymers having a very low $T_g$ to increase impact strength of the cured adhesives at low temperatures.

24 Claims, No Drawings

ACRYLATE/METHACRYLATE ADHESIVES INITIATED BY CHLOROSULFONATED POLYMER

BACKGROUND

The invention relates generally to adhesives acrylate/methacrylate adhesives initiated by chlorosulfonated polymer. More particularly, the invention relates to such adhesives having a consistent cure profile over their shelf life, and having improved toughening and impact properties at low temperatures.

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Acrylate and methacrylate based adhesives are used in the bonding of components, such as in the construction of automobiles, boats, and other products and structures. Typically, two parts of the adhesive are prepared and stored prior to mixing the two parts to give the final adhesive. For acrylate and methacrylate adhesives initiated by chlorosulfonated polymers, one part generally contains one or more initiators, such as the chlorosulfonated polymer (e.g., chlorosulfonated polyethylene), and the other part contains at least one corresponding reducing agent. Generally, the acrylate and methacrylate monomers may be included in both parts.

Typically, the two parts are mixed to apply the adhesive and to polymerize the monomers. During the curing of the mixed adhesive parts, the reaction or polymerization of the acrylate and/or methacrylate monomers is exothermic. Thus, the combined-adhesive parts generally experience an increase in temperature until a peak exotherm temperature is reached. After the adhesive reaches its peak exotherm temperature, the temperature of the adhesive may gradually return to ambient temperature. The cure profile of the adhesive may be characterized, in part, by the value of the peak exotherm temperature, and also by the time to reach the peak exotherm temperature (the peak exotherm time). It should be noted that the peak exotherm temperature and time are generally understood variables in the adhesive industry and are normally readily measurable.

Other adhesive variables of interest, such as the adhesive working time (or open time), adhesive fixture time, and so forth, may relate to the peak exotherm time. For example, the working time typically expires prior to the adhesive experiencing its peak exotherm temperature. In practice, the working time of the adhesive may be characterized as the time from when the two adhesive parts are mixed to the point in time that the combined adhesive parts become difficult to apply or non-malleable, i.e., at the onset of a significant viscosity increase in the adhesive during its curing. An adhesive passing its working time may lose its ability to adhere to the substrates or objects being bonded. As for fixture time, it may fall at various points along the cure profile relative to the peak exotherm time, depending on how fixture time is defined and on the given application, and so on. Certain adhesive manufacturers and users may characterize fixture time as the point in the curing of the adhesive where the adhesion and strength of the final adhesive are such that the bonded objects no longer require external construction supports, for example. However, it should be emphasized that both the working time and fixture time may be defined differently by the various adhesive manufacturers and users. Indeed, working time and fixture time are generally application-dependent. For instance, the working time may be a function of the size of the adhesive bead that is applied to the bonded objects, and so on. The fixture time may depend on the size and weight of the bonded objects, for example, if the fixture time is defined by handling strength.

Typically, it is important for these adhesives to have a reproducible or repeatable cure profile over the shelf life of the adhesive, so that end users may predict the available working time, fixture time, and so forth. For example, the end user may rely on the predicted cure profile to estimate a fixture time to know how long the user should wait before de-molding or de-clamping the bonded objects. In general, the end user may rely on the predicted cure profile to design or modify its application process. The cure profile of the mixed adhesive should be substantially the same, whether the adhesive parts have been stored for one day, one month, or one year, and should be substantially the same as the initial cure profile that may be reported by the adhesive manufacturer or determined by the end user. A repeatable cure profile may be especially important in the bonding of large components, such as in the construction of boats, truck cabs, truck trailers, and other structures.

Again, acrylate and methacrylate-based adhesives that may be used in the bonding of objects, such as in the manufacture of boats and large trucks, are those initiated by chlorosulfonated polymers (e.g., chlorosulfonated polyethylene). Advantageously, acrylate and methacrylate-based adhesives are generally curable at ambient or room temperatures. Further, the chlorosulfonated polymers not only initiate polymerization of the acrylate and methacrylate monomers, but may also act as a polymeric modifier, affecting the physical properties of the cured adhesive. Generally, such adhesives, when cured, exhibit desirable physical properties, such as good lap shear strength at higher temperatures, e.g., about 150° F. to 220° F. (66° C. to 104° C.). However, these adhesives initiated by chlorosulfonated polymer, when cured, may become brittle at low temperatures, e.g., at −40° F. (−40° C.). This is due, in part, to the fact that the chlorosulfonated polymer typically has a glass transition temperature, $T_g$, higher than about −17° F. (−27° C.). Therefore, it is desirable to improve the performance (e.g., toughening and impact resistance) of such adhesives at low temperatures without sacrificing their performance (e.g., lap shear strength) at high temperatures. Another problem with use of these adhesives is that the cure profile varies throughout the shelf life of the adhesive parts. Thus, with acrylate/methacrylate adhesives initiated by chlorosulfonated polymer, the peak exotherm time and temperature, working time, fixture time, and other properties related to the cure profile, vary undesirably over the shelf life of the adhesive parts.

DETAILED DESCRIPTION OF SPECIFIC EMBODIMENTS

One or more exemplary embodiments of the present invention will be described below. In an effort to provide a concise description of these embodiments, not all features of an actual implementation are described in the specification. It should be appreciated that in the development of any such actual implementation, as in any product development, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate discussion of the present techniques, the written description is provided in sections. Section I introduces the benefits of the present techniques. Section II discusses the components of the exemplary adhesive formulations. Section III briefly discusses preparing and applying the present adhesives. Section IV provides example formulations.

I. Introduction

The present techniques are directed to improving the use and the performance of acrylate/methacrylate-based structural adhesives initiated by chlorosulfonated polymer. The techniques provide for a more consistent cure profile of such adhesives over the shelf life of the adhesives. Moreover, the peak exotherm time may be extended, if desired. Further, the impact strength and toughness of the cured adhesives are improved at low temperatures while not sacrificing performance (e.g., lap shear strength) of the final adhesives at high temperatures.

A. Consistent Cure Profile

The cure profiles of these adhesives are made more consistent over their shelf life by adding cure profile regulators to the adhesive formulations. Cure profile regulators which provide for a substantially repeatable cure profile (e.g., repeatable peak exotherm time) are cycloheteroatom zirconates, cycloheteroatom titannates, or a combination thereof. It should be noted that the length of the shelf life of the adhesive parts may be depend on a variety of factors, such as the occurrences of premature curing, excessive degradation, undesirable increase in viscosity, and the like. Quite often, the mechanisms or root causes of a short shelf life are not known. Moreover, the shelf life may be application-dependent, varying with the requirements of the user, for example. Commonly, the shelf life of the adhesive parts (i.e., Part A and Part B) may range from 6 months to 1 year. However, it should be emphasized that the shelf life of the present formulations may exist outside this exemplary range.

B. Extended Peak Exotherm Time

Further, water and/or additional chelating agents may be added to the formulation to extend the peak exotherm time of these adhesives. Such an extended peak exotherm time may be desired, for example, in the bonding of large objects or panels where considerable working time is desired to facilitate application of the adhesive to bond the objects or panels. In example 3 below, with the addition of 1 wt. % water, the time to reach the peak exotherm temperature is extended from 98 minutes to 180 minutes. In example 4 below, the addition of a chelating agent extended the time to reach the peak exotherm temperature from 64 minutes to 108 minutes. The chelating agent utilized in example 4 was ethylenediaminetetraacetic acid tetra sodium salt (EDTA Na$_4$) in a water and ethylene glycol solution. It is believed that chelating agents generally block the adverse effect of metal residues and metal contamination in the adhesive on the consistency of the adhesive cure profile.

C. Increased Toughening and Impact Strength

Toughening agents having very low glass-transition temperatures (e.g., less than −50° C.) are added to the adhesive formulation to reduce brittleness and to increase the impact strength of the cured adhesive at low temperatures, e.g., −40° F. (−40° C.), while not sacrificing properties, such as lap shear strength, at higher temperatures, e.g., about 180° F. (82° C.). This may be important, for example, for automobiles and boats having parts bonded with acrylate/methacrylate-based adhesives that may be subjected to various weights and forces in a wide range of environments and ambient temperatures. For instance, livestock trucks or trailers having such bonded parts may travel from a warm environment in Mexico to a cold environment in Canada, and experience various loads and stresses, depending on the number of animals, the weight, and any load shift in the truck or trailer, as well as, the quality of the roads and highways, and so forth. In another example, boats having such bonded parts may be subjected to pounding waves in both hot and cold ambient environments, and so on.

These toughening agents include copolymers (e.g., block copolymers) having a glass transition temperature, $T_g$, of at least one domain in the range of in the range of −50° C. to −110° C. Embodiments of these new toughening agents include styrene-butadiene-styrene (SBS) copolymers. Commercial examples of such SBS copolymers are Kraton® D1116 ($T_g$=−91° C.) and Kraton® 1184 ($T_g$=−91° C.) from Shell Chemical LP of Houston, Tex. In example 1 given below, the cured adhesives, with and without these very low $T_g$ SBS copolymers, were subjected to a drop test at −40° F. (−40° C.) developed by Thomas Built Buses of High Point, N.C. Advantageously, as depicted in example 1, with the addition of these Kraton® polymers to the adhesive, the number of hits in the drop test, prior to failure of the tested adhesive, approximately doubled.

II. Components of the Adhesive Formulations

The types of components, and the ratio of such components, in the adhesive redox system may be adjusted to change or regulate the peak exotherm temperature/time and the cure profile of acrylate/methacrylate adhesives initiated by chlorosulfonated polymer. The adhesive redox system generally includes oxidizing agents which may be primary and secondary initiators, such as chlorosulfonated polyethylene and peroxides (e.g., cumene hydroperoxide), respectively. The redox system also typically includes reducing agents, such as those that react or interact with the sulfonyl chloride group of the chlorosulfonated polymer to help generate initiating radicals. In certain embodiments, the redox system primarily determines the adhesive cure profile and may affect the shelf life.

Moreover, the balance between elastomeric-polymer toughening agents and impact modifiers (e.g., core-shell structured polymers) may be employed to maintain a combination of bond strength, impact strength, tensile strength and cyclic fatigue performance of cured adhesives at low temperatures, e.g., less than −40° F. (−40° C.), while not sacrificing performance at elevated temperatures. As used herein and discussed below, toughening agents generally refer to block copolymers, while impact modifiers generally refer to core-shell structured copolymers.

The adhesives of the present techniques include at least two parts, Part A and Part B, which are mixed together prior to application of the adhesives. These two parts may be stored by the manufacturer or end-user prior to the mixing of the two parts to give the final mixed adhesive. Exemplary composition ranges of the components in the final adhesives, after the parts have been mixed (yet prior to polymerization), are given in Table 1. Examples of the components listed in Table 1 are also discussed below. Moreover, as appreciated by one of ordinary skill in the art, other ingredients such as chain transfer agents, pigments, spacers, fragrance, fillers, fire retardants, and so on, may be added in the present adhesive formulations. It should be noted that specific exemplary compositions of the two parts (i.e., Part A and Part B) prior to mixing are given in specific examples listed in Tables 2 through 5.

Lastly, it should also be noted that the adhesive formulations encompassed in Table 1 may be used to bond objects in the construction and repair of vehicles. Such vehicles may include automobiles, cars, passenger trucks, transport trucks, livestock trucks, trailers, buses, boats, and so on. Of course, the present adhesives may be employed in a variety of other applications, such as in the construction of wind mill blades, and so forth.

-continued

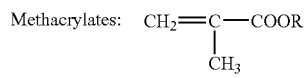

where $R=C_nH_{n+1}$, and where $n=1, 2, 3 \ldots 20$.

Again, the majority of the monomers are lower MW monomers, generally those with $n \leq 2$, and commonly those with $n=1$, which are methyl acrylate and methyl methacrylate, respectively. For $n=2$, the monomers are ethyl acrylate and ethyl methacrylate.

TABLE 1

Composition of Final Adhesives Prior to Polymerization

| Component | Exemplary Ranges, % by weight | | |
|---|---|---|---|
| | Ranges X | Ranges Y | Ranges Z |
| Acrylate/Methacrylate Monomer(s) | 45-75 | 50-70 | 55-65 |
| Chlorosulfonated polymer resin(s) | 2-16 | 3-12 | 4-8 |
| Toughening agent(s) | 1-20 | 2-16 | 3-10 |
| Impact modifier(s) | 10-30 | 13-25 | 16-22 |
| Reducing agent(s) | 0.5-4 | 0.8-3 | 1-2 |
| Inhibitor(s)/Retardant(s) | 0.01-2 | 0.05-1.8 | 0.1-1.5 |
| Cure profile regulator(s) | 0.1-0.8 | 0.15-0.6 | 0.2-0.4 |
| Carboxylic acid(s) | 0-10 | 0.5-6 | 1-3 |
| Wax | 0.5-4 | 0.8-3 | 1-2 |
| Chelating agent(s) | 0-0.2 | 0.01-0.1 | 0.02-0.08 |
| Water | 0-4 | 0.5-3 | 1-2 |
| Catalysts/Secondary initiator(s) | 0-3 | 0.5-2 | 0.7-1.5 |
| Other monomer(s) | 0-8 | 1-6 | 2-4 |
| Accelerator(s) | 0-0.0005 | 0.00005-0.0004 | 0.00008-0.0002 |

Again, Part A and Part B are generally mixed together at the time of use to form the final adhesive. In certain embodiments, Part A contains the chlorosulfonated polymer(s), carboxylic acid(s), and secondary initiator(s), while Part B contains the reducing agent(s), cure profile regulator(s), and accelerator(s). The remainder of the components in Table 1 can be placed in either Part A or Part B, or in both. In one embodiment, these remaining components are divided evenly in both parts, except that the acrylate/methacrylate monomer(s) and the impact modifier(s) are apportioned between Part A and Part B to provide a similar viscosity for both Part A and Part B. The volume ratio between Part A and Part B can vary greatly, for example, from 10:1 to 1:2. In certain embodiments, the ratio between Part A and Part B is 1:1 by volume.

A. Acrylate/Methacrylate Monomers

In general, the acrylate and/or methacrylate monomers include a combination of higher molecular weight (MW) and lower molecular weight (MW) acrylates and methacrylates which are polymerized during the curing process. The lower MW monomers may be characterized by the alcohol portion of the ester group having 1 to 2 carbon atoms, and the higher MW monomers may be characterized by the alcohol portion of the ester group having 3 to 20 carbon atoms. The acrylate and/or methacrylate monomers, and their mixtures, have the following general structures.

Acrylates: 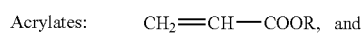 and

The higher MW monomers, those with $n>2$, commonly $n=10-18$, and more commonly $n=12-16$, may be optionally used, for example, to improve the anti-sliding performance, reduce shrinkage, lower the peak exotherm temperature to avoid a monomer boil problem, and so on. In general, higher MW monomers, particularly those with ether linkages, may be optionally employed to control boiling during curing. However, to avoid unacceptable mechanical properties and poor chemical resistance of the final cured adhesive, the amount of these higher MW monomers generally does not exceed 14% by weight based on the final adhesive. In certain embodiments, the amount is less than 9% by weight based on the final adhesive. In other embodiments, the amount of these higher MW monomers is less than 6% by weight based on the final adhesive. A commercial example of these higher MW monomers employed in the present formulations is SR 313B, which is a mixture of $C_{12}$, $C_{14}$, and $C_{16}$ methacrylates from Sartomer Company, Inc. of Exton, Pa.

B. Chlorosulfonated Polymer

In certain embodiments, the chlorosulfonated polymers, such as chlorosulfonated polyethylene, are used primarily as free radical initiators of the acrylate/methacrylate based adhesives described herein. As discussed below, secondary initiators, such as certain peroxides, may also be employed in addition to the chlorosulfonated polymer. The chlorosulfonated polymer generally includes residual sulfonyl chloride and may also be dissolved in a polymerizable vinyl monomer prior to addition of the chlorosulfonated polymer to the adhesive formulation. Commercial examples of chlorosulfonated polymer are chlorosulfonated polyethylenes sold under the trade name HYPALON® polymers (synthetic rubbers) by E. I. Du Pont de Nemours & Company of Wilmington, Del. The sulfonyl chloride groups, such as those in HYPALON® polymers, provide reactive sites to initiate free radical polymerization in the presence of reducing agents for room temperature cure applications. Specific examples of HYPALON® polymers that may be employed with the present techniques for adhesive applications are HYPALON® 20, HYPALON® 30, HYPALON® 48, and HYPALON® LD-999. The differences in the various grades of HYPALON® polymers may include the degree of branching in the polymer chains, the percent of chlorine in the polymers, and other factors. Lastly, it should be noted that chlorosulfonated polymer may also act as a polymeric modifier (i.e., toughening agent or impact modifier). However, as discussed below, polymeric modifiers other than chlorosulfonated polymers are typically added to the adhesive formulations.

C. Toughening Agents

Elastomers and polymers employed as toughening agents may have a glass transition temperature ($T_g$) of less than −25° C., and advantageously less than −50° C. Further, these toughening agents may beneficially be soluble in the monomers described above. In general, the elastomers may include synthetic high polymers. Moreover, the elastomers may be supplied commercially as adhesive or cement grades. Elastomers and polymers employed with the present techniques may include polychloroprene (neoprene) and block copolymers of butadiene or isoprene with styrene, acrylonitrile, acrylates, methacrylates, and the like.

As discussed, because chlorosulfonated polymers, such as HYPALON® polymers, have relatively high glass transition temperatures, e.g., higher than −17° F. (−27° C.), the use of chlorosulfonated polymers to initiate the acrylate/methacrylate adhesives may result in the cured adhesives becoming stiff and brittle (lower impact strength) at low temperatures (e.g., −20° C. to −50° C.). Further, the use of chlorosulfonated polymers in acrylate/methacrylate adhesives may result in a higher crosslinking density in the cured adhesives. Thus, for this reason as well, adhesives initiated by chlorosulfonated polymers may tend to be more brittle.

Therefore, to improve impact strength at low temperatures, the toughening agents added to the present adhesive formulations may include very low $T_g$ elastomeric polymers that are soluble in the acrylate and/or methacrylate monomers. In particular, the $T_g$ of at least one domain of these toughening agents is in the range of about −50° C. to about −110° C., commonly in the range of about −65° C. to about −105° C., and more commonly in the range of about −80° C. to about −100° C. Examples include styrene-butadiene-styrene (SBS) copolymers. The radial type of these SBS polymers may be particularly beneficial as a toughening agent. As mentioned, commercial examples of these SBS copolymers are Kraton® D1116 ($T_g$=−91° C.) and Kraton® 1184 ($T_g$=−91° C.) from Shell Chemical LP of Houston, Tex. The toughening agents can improve toughness and impact resistance of cured adhesives at low temperatures, e.g., less than −40° F. (−40° C.), while not adversely affecting performance (e.g., lap shear strength) of cured adhesives at elevated temperatures (e.g., 150° F. to 220° F.). As indicated in Table 1, the amount of toughening agents generally falls within about 1-20 wt. % of the present adhesive formulations.

D. Impact Modifiers

The adhesives formulated with impact modifiers exhibit desirable properties for many adhesive applications. For example, impact modifiers have a similar effect on the cured adhesives as toughening agents in reducing brittleness and increasing impact strength of the cured adhesives. The impact modifiers may also provide improved non-sag and thixotropic properties, and anti-sliding performance in the uncured adhesives. As expressed herein, the impact modifiers generally include graft copolymers that may be characterized as core-shell copolymers having a rubbery "core," a hard "shell," and that swell in the methacrylate and/or acrylate monomer compositions but do not dissolve therein. Examples of core-shell copolymers are those where the hard "shell" monomers, such as styrene, acrylonitrile, or methyl methacrylate, are grafted onto a rubbery "core" made from polymers of butadiene, butyl acrylate, ethyl acrylate, isoprene and the like. One type of core-shell polymers is methacrylate butadiene styrene (MBS) copolymer made by polymerizing methyl methacrylate in the presence of polybutadiene or a polybutadiene copolymer rubber. Commercial examples of such MBS copolymers are PARALOID® BTA-753 from Rohm and Haas Company of Philadelphia, Pa., and KANE ACE B-564 from Kaneka Texas Company of Houston, Tex. As indicated in Table 1, the amount of impact modifiers (core-shell copolymers) generally falls within about 10-30 wt. % of the present adhesive formulations.

E. Reducing Agents

Generally, the reducing agents employed in the present adhesives may react or interact with the sulfonyl chloride group of the chlorosulfonated polymer. As indicated in Table 1, the amount of reducing agents employed in the present adhesive formulations generally falls in the range of 0.5-4 wt. %. A commercial example of such a reducing agent is REILLY PDHP™ from Reilly Industries, Inc. of Indianapolis, Ind. The reducing agent REILLY PDHP™ is a mixture in which the active ingredient is believed to be n-phenyl-2-propyl-3,5-diethyl-1,2-dihydropyridine having the chemical formula $C_{15}H_{25}N$ and structure depicted below.

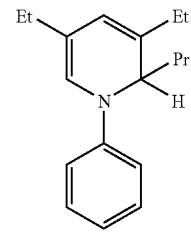

F. Water

Water may be added to the formulation to extend the peak exotherm time and to lower the peak exotherm temperature. While relatively small amounts of water may be introduced to the adhesive formulations indirectly from the raw materials and/or the manufacturing process, up to an additional 4 wt. % water may be added to the adhesive formulations directly to adjust the cure profile. In example 3 below, an additional 1 wt. % water added to the formulation increased the peak exotherm time from 98 minutes to 180 minutes.

G. Inhibitors/Retardants

Inhibitors/retardants are normally used to prevent premature curing and to help the redox system to provide for a desired and consistent cure profile, and thus a consistent working time. Examples for acrylate and/or methacrylate systems may include combinations of butylated hydroxytoluene (BHT, 2, 6di-tert-butyl-p-cresol) and quinone(s), which commonly may be employed for medium and long open time adhesives. A specific example of an inhibitor/retardant system is a combination of butylated hydroxytoluene (BHT) and hydroquinone (HQ). Hydroquinone is also known as para-dihydroxybenene. As indicated in Table 1, the inhibitors/retardants generally fall within about 0.01-2 wt. % of the present adhesive formulations.

H. Cure Profile Regulators

Cure profile regulators are expressly defined herein as chemicals that regulate the cure profile of the adhesive but not including the other components listed in Table 1 that might significantly affect the cure profile, such as the inhibitors/retardants, chelating agents, components of the redox system, water, and so on. Cure profile regulators at relatively low amounts (e.g., 0.1 to 0.8 wt. % of the adhesive) can beneficially make the cure profile of acrylate/methacrylate adhesives (initiated at ambient temperature by chlorosulfonated polymers, such as chlorosulfonated polyethylene or HYPALON® polymers) more consistent over the shelf life of the adhesives. Such exemplary cure profile regulators may include cycloheteroatom zirconates and cycloheteroatom titanates. A commercial example is KZ TPP (cyclo[dineopentyl(diallyl)]pyrophosphatodineopentyl(diallyl) zirconate) from Kenrich Petrochemicals, Inc. of Bayonne, N.J. In example 2 below, with the addition of a cure profile regulator to the adhesive formulation, the peak exotherm time varied by less than 10 minutes.

I. Chelating Agents

Common purpose chelating agents can be utilized in the present adhesive formulations (e.g., less than 0.2 wt. %), such as for medium and long open time adhesives, to reduce cure profile variation. The chelating agents may be particularly effective in reducing variation caused by metal residues in the adhesive raw materials, as well as from metal contamination of the adhesive during manufacturing, storage, and so on. Chelating agents also address premature curing caused by the contact of finished adhesives with bare metals, such as those bare metals contacted in adhesive dispensing equipment, and so forth. Moreover, water may be used as a solvent for the chelating agents. In example 4 given below, the addition of a chelating agent (EDTA $Na_4$ in water and ethylene glycol), extended the time to reach the peak exotherm temperature from 64 minutes to 108 minutes.

J. Carboxylic Acids

Optionally, one or more organic acids, such as carboxylic acids, may be employed in the adhesive formulation to enhance adhesion of the adhesive to the substrates or components. Exemplary carboxylic acids include methacrylic acid, maleic acid, acrylic acid, crotonic acid, fumaric acid, malonic acid, and so on. Additional examples of these organic or carboxylic acids are acetylene dicarboxylic acid, dibromo maleic citranoic acid, mesaconic acid, and oxalic acid. By adding one or more carboxylic acids, particularly strong organic carboxylic acids, to the present acrylate and/or methacrylate-based adhesive compositions, the bonding characteristics of the adhesive compositions to the subsequently bonded structural components and parts are improved. It is believed that the addition of carboxylic acids promotes adhesion to solvent-resistant and/or heat-resistant plastics, thermosets, thermoplastics, resin/glass composites, resins, fiber reinforced composites, metals, and so on, due to interactions at the molecular level, e.g., through hydrogen bonding, and the like. Typically, the present formulations contain less than 10 wt. % of carboxylic acids. It has further been discovered that the addition of water to compositions containing these acids can increase their effectiveness, apparently through partial or enhanced solubility, which is believed to aid in the dissociation thereof. These adhesive effects can further be enhanced by heat treatment of the bonds either during or after the bonding step (or both).

K. Secondary Initiators

As discussed, the primary initiators of the present adhesive formulations are chlorosulfonated polymers, such as chlorosulfonated polyethylene (e.g., HYPALON® polymers sold by Du Pont). However, secondary initiators may be employed as supplemental initiators. Both primary and secondary initiators may interact with the corresponding reducing agents and are decomposed to form initiating radicals in free radical polymerization of acrylate and methacrylate monomers. Secondary initiators may include peroxides (e.g., cumene hydroperoxide, t-butyl hydroperoxide, and so on) that are substantially stable in the present monomers at room temperature. Moreover, secondary initiators are generally less than 3 wt. % of the present adhesive formulations.

L. Other Higher MW Monomers

As indicated in Table 1, other higher MW monomers may be employed, at typically less than 8 wt. % of the present adhesive formulations, to reduce the peak exotherm temperature (i.e., to reduce monomer boiling), to reduce shrinkage, and so on. These other higher MW monomers are typically longer chain monofunctional molecules. An example is polyethylene glycol methacrylates. A commercial example is product CD550, which is methoxy polyethylene glycol (350) monomethacrylate from Sartomer Company, Inc.

M. Wax

Wax with a melting point range around 110 to 170° F. may be used, for example, to minimize monomers evaporating from the surface of adhesives during application. One category is petroleum hydrocarbon waxes. A commercial example of such a petroleum hydrocarbon wax is Boler 1977 from IGI Inc. of Buena, N.J. Generally, only about 0.5 to 4 wt. % of the present adhesive formulations is wax.

N. Accelerators

A catalytic amount of accelerators may be employed (e.g., less than 0.0005 wt. %) to formulate fast cure adhesives (e.g., 90 seconds of working time). These accelerators or promoters are primarily organic transitional metal compounds, such as copper acetyl acetonate, vanadium acetyl acetonate, and so forth. In general, the accelerators or promoters may be organic salts of a transition metal, such as cobalt, nickel, manganese or iron naphthenate, copper octoate, copper acetylacetonate, iron hexoate, iron propionate, and so on.

III. Preparing and Applying the Adhesives

Initially, two parts (Part A and Part B) of a methacrylate/acrylate adhesive initiated by chlorosulfonated polymer are prepared. In certain embodiments, Part A may include chlorosulfonated polymer, carboxylic acid, and secondary initiators, while Part B may contain a reducing agent, cure profile regulators, and accelerators. Certain components, such as the impact modifiers, and the methacrylate and/or acrylate monomers, may be apportioned between Part A and Part B to provide for a similar viscosity of Parts A and B. As indicated, the volume ratio between Parts A and Part B can vary greatly, for example, from 10:1 to 1:2. In some embodiments, the ratio between Part A and Part B is 1:1 by volume.

It should be noted that the order of addition in making Part A and Part B can vary greatly. Moreover, the commercial preparation of Part A and Part B may also involve making stock or premix solutions, cooling the adhesive formulations at intermediate and final steps, degassing the adhesive parts under a vacuum, and so on. As appreciated by those of ordinary skill in the art, equipment that may be employed in making Part A and Part B include vessels, piping, valves, transfer pumps, vacuum pumps, mixers (e.g., high speed agitators or dispersers), and so forth. The Part A and Part B formulations may be delivered to the end-user in differing types of containers, ranging from small cartridges to 55-gallon drums, and the like.

After preparation of Parts A and B of the adhesive, the two parts may be stored in inventory by the adhesive manufacturer, the distributor, end-user, and so on. On the other hand, Part A and B may be used or applied soon after transport (without intermediate storage) to bond objects. However, it is common for either the manufacturer or the user to store Part A and Part B prior to combination and use of the two parts. Thus, as discussed, it is generally beneficial to have a consistent cure profile over the shelf life of Part A and Part B. Again, it is generally desirable for the user to know the behavior of the cure profile (e.g., peak exotherm temperature and time) to appropriately manage the application of adhesive and the construction/bonding of the structural components, pieces, parts, and so on. Therefore, ingredients, such as cure profile regulators, are added to the adhesive to provide for a more consistent cure profile. In certain embodiments, the deviation in the peak exotherm time is less than 10 minutes over the shelf life of the adhesive. Note that in the examples described below, the cure profile regulator(s) are added to Part B. However, in other embodiments and examples, cure profile regulators may be added to Part A.

To apply the adhesive, Part A and Part B are combined or mixed together, (e.g., through a static mixer). The combined Part A and Part B may then be applied to a first component and/or a second component. After such application of the adhesive, the first component and the second component may be adhered to each other via the applied adhesive. Lastly, the adhesive is allowed to cure, typically at ambient or room temperature.

IV. Examples

Aspects and embodiments of the present techniques will be described with reference to the following examples. These examples are provided for purposes of illustration and are not intended to be construed as limiting the scope of the techniques.

Example 1

Kraton® D1116 as a Very Low $T_g$ Toughening Agent

TABLE 2

LOW TEMPERATURE PERFORMANCE WITH KRATON ® D1116

| | % by weight | | | |
|---|---|---|---|---|
| | Part A | | Part B | |
| Ingredient | Ex. 1-1 | Ex. 1-2 | Ex. 1-3 | Ex. 1-4 |
| Methyl methacrylate | 26.3 | 22.3 | 58.66 | 58.66 |
| SR 313B | — | — | 4.00 | 4.00 |
| HYPALON ® 30 | 9.75 | 9.75 | — | — |
| Methacrylic acid | 5.25 | 5.25 | — | — |
| Neoprene AD10 Premix[a] | 42.90 | 42.90 | — | — |
| Kraton ® D1116 | — | 4.00 | — | 4.00 |
| PARALOID ® BTA 753 | 12.80 | 12.80 | 23.00 | 23.00 |
| IGI Paraffin wax 1230 | 1.00 | 1.00 | — | — |
| Boler 1977 wax | — | — | 1.00 | 1.00 |
| REILLY PDHP ™ | — | — | 12.00 | 12.00 |
| BHT | 0.90 | 0.90 | — | — |
| Ken-React ® KZ TPP | — | — | 0.30 | 0.30 |
| 5% EDTA Na$_4$ Premix[b] | 0.40 | 0.40 | 0.40 | 0.40 |

TABLE 2-continued

LOW TEMPERATURE PERFORMANCE WITH KRATON ® D1116

| Cumene hydroperoxide | 0.70 | 0.70 | — | — |
|---|---|---|---|---|

| | Ex. 1-1/Ex. 1-3 | Ex. 1-2/Ex. 1-3 | Ex. 1-2/Ex. 1-4 |
|---|---|---|---|
| Drop test[c] at −40° F., number of hits | <2 | 2 | 3-4 |
| Drop test failure mode | bond-line | substrate | substrate |
| Chisel cleavage test[d] at −40° F., inch | >12 | 3-4 | 2-2.5 |
| Lap shear strength at 220° F., psi[e] | 723 | 689 | 728 |
| Failure mode | CF | CF | CF |
| at 180° F., psi[e] | 1090 | 851 | 854 |
| Failure mode | substrate | 40CF60AF | 60CF40AF |

[a]The premix contains 15.35 wt. % of Neoprene AD10, 0.02% of 1,4-NQ and 84.63% of methylmethacrylate acid (MMA).
[b]5 wt. % EDTA Na$_4$ in 47.5% water and 47.5% ethylene glycol.
[c]The drop test was developed by Thomas Built Buses of High Point, North Carolina. An 85 lb. Drop Impact Panel Tester is employed.
[d]The chisel cleavage test was developed by Thomas Built Buses as part of their drop test. The unbroken bond-line between two panels is used for the chisel cleavage test. The test result (in inches) is the length of separation along the bond-line of the two panels.
[e]Samples cured at room temperature (RT) for about 16 hours, were post-cured at 240° F. for 30 minutes, and then were conditioned at RT for about 4 hours. The substrate was epoxy primer coated steel provided by Thomas Built Buses. The samples were pulled at a specified temperature for 30 minutes. CF: cohesive failure; AF: adhesive failure; 40CF60AF: 40% CF and 60% AF.

In example 1, the mix ratio of Part A to Part B is 10:1 by volume. The results in Table 2 demonstrate that Kraton® D1116 improved the impact strength of cured adhesive at −40° F., while the cured adhesive maintained lap shear strength at 220° F. The increase in impact strength is demonstrated by the increasing number of hits prior to failure in the drop test.

Example 2

Effect of Ken-React® KZ TPP on the Cure Profile

TABLE 3

Effect of Ken-React ® KZ TPP on Peak Exotherm Time

| | % by weight | | |
|---|---|---|---|
| | Part A | Part B | |
| Ingredient | Ex. 2-1 | Ex. 2-2 | Ex. 2-3 |
| Methyl methacrylate | 52.00 | 58.66 | 58.26 |
| SR 313B | 4.00 | 6.00 | 6.00 |
| HYPALON 30 | 16.00 | — | — |
| Methacrylic acid | 5.00 | — | — |
| Kraton ® D1116 | 3.00 | 3.00 | 3.00 |
| PARALOID ® BTA 753 | 12.00 | 21.00 | 21.00 |
| IGI Paraffin wax 1230 | 1.00 | — | — |
| Boler 1977 wax | — | 1.00 | 1.00 |
| REILLY PDHP ™ | — | 3.00 | 3.00 |
| BHT | 0.50 | 0.50 | 0.50 |
| HQ | 0.04 | 0.04 | 0.04 |
| Ken-React ® KZ TPP | — | 0.40 | — |
| 5% EDTA Na$_4$ Premix | 0.40 | 0.40 | 0.40 |
| Cumene hydroperoxide | 1.50 | — | — |
| CD550 | — | 6.00 | 6.00 |
| PVA B-15[a] | 4.56 | — | — |

10 gram (g) Exotherm at Room Temperature (RT)

Exotherm Time/Temperature

TABLE 3-continued

Effect of Ken-React ® KZ TPP on Peak Exotherm Time

| Time Prior to Mixing | Ex. 2-1/Ex. 2-2 min./° F. | Ex. 2-1/Ex. 2-3 min./° F. |
|---|---|---|
| Initial | 83/247 | 54/249 |
| 1 month | 82/235 | 76/229 |
| 2 months | 79/246 | 79/243 |
| 3 months | 80/242 | 84/231 |
| 4 months | 78/245 | 85/244 |

[a]PVA B-15 is polyvinyl acetate homopolymer from McGean-Rohco, Inc. of Cleveland, Ohio, and is used as shrink control agent.

In example 2, the mix ratio of Part A to Part B is 1:1 by volume. Ken-React® KZ TPP affects not only the initial cure profile (that can be described with the exothermic graph of adhesive temperature versus time) but also the stability of the cure profile over the shelf life. In this example, with the addition of a cycloheteroatom zirconate, the time to reach peak exotherm time deviated 1 to 5 minutes from the initial peak exotherm time over a four-month period. In contrast, without the addition of a cycloheteroatom zirconate, the peak exotherm time deviated by as much as 30 minutes from the initial peak exotherm time over the same four-month period. Moreover, without the addition of a cycloheteroatom zirconate, the peak exotherm time (and thus potentially the fixture time) slowed over the four-month period.

Example 3

Effect of Water on Cure Profile

TABLE 4

Effect of Water on Initial Exotherm Time and Temperature

| | % by weight | | | |
|---|---|---|---|---|
| | Part A | | Part B | |
| Ingredient | Ex. 3-1 | Ex. 3-2 | Ex. 3-3 | Ex. 3-4 |
| Methyl methacrylate | 52.00 | 51.00 | 58.66 | 57.66 |
| SR 313B | 4.00 | 4.00 | 6.00 | 6.00 |
| HYPALON 30 | 16.00 | 16.00 | — | — |
| Methacrylic acid | 5.00 | 5.00 | — | — |
| Kraton ® D1116 | 3.00 | 3.00 | 3.00 | 3.00 |
| PARALOID ® BTA 753 | 12.00 | 12.00 | 21.00 | 21.00 |
| IGI Paraffin wax 1230 | 1.00 | 1.00 | — | — |
| Boler 1977 wax | — | — | 1.00 | 1.00 |
| REILLY PDHP ™ | — | — | 3.00 | 3.00 |
| BHT | 0.50 | 0.50 | 0.50 | 0.50 |
| HQ | 0.04 | 0.04 | 0.04 | 0.04 |
| Ken-React ® KZ TPP | — | — | 0.40 | 0.40 |
| 5% EDTA Na$_4$ in H$_2$O | 0.40 | 0.40 | 0.40 | 0.40 |
| Water | — | 1.00 | — | 1.00 |
| Cumune hydroperoxide | 1.50 | 1.50 | — | — |
| CD550 | — | — | 6.00 | 6.00 |
| PVA B-15 | 4.56 | 4.56 | — | — |

| | Ex. 3-1/Ex. 3-3 | Ex. 3-2/Ex. 3-4 |
|---|---|---|
| 10 g exotherm at RT, min./° F. | 98/241 | 180/199 |

In example 3, the mix ratio of Part A to Part B is 1:1 by volume. As indicated in Table 4, an additional 1% water almost doubled the peak exotherm time (and thus potentially the working time), but at same time cooled the peak exotherm temperature by 42° F. The peak exotherm time is increased from 98 minutes to 180 minutes.

Example 4

Effect of EDTA Na4 on the Cure Profile

TABLE 5

Formulas with and without EDTA Na4 Premix and Their Exotherms

| | % by weight | | | |
|---|---|---|---|---|
| | Part A | | Part B | |
| Ingredient | Ex. 4-1 | Ex. 4-2 | Ex. 4-3 | Ex. 4-4 |
| Methyl methacrylate | 51.94 | 52.04 | 59.10 | 58.70 |
| SR 313B | 4.00 | 4.00 | 6.00 | 6.00 |
| HYPALON 30 | 16.00 | 16.00 | — | — |
| Methacrylic acid | 5.00 | 5.00 | — | — |
| Kraton ® D1116 | 3.00 | 3.00 | 3.00 | 3.00 |
| PARALOID ® BTA 753 | 12.00 | 12.00 | 21.00 | 21.00 |
| IGI Paraffin wax 1230 | 1.00 | 1.00 | — | — |
| Boler 1977 wax | — | — | 1.00 | 1.00 |
| REILLY PDHP ™ | — | — | 3.00 | 3.00 |
| BHT | 1.00 | 1.00 | 1.00 | 1.00 |
| Ken-Reac ® KZ TPP | — | — | 0.40 | 0.40 |
| 5% EDTA Na$_4$ Premix | — | 0.40 | — | 0.40 |
| Cumune hydroperoxide | 1.50 | 1.50 | — | — |
| CD550 | — | — | 6.00 | 6.00 |
| PVA B-15 | 4.56 | 4.56 | — | — |

| | Ex. 4-1/Ex. 4-3 | Ex. 4-2/Ex. 4-4 |
|---|---|---|
| 10 g Exotherm at RT, min./° F. | | |
| Initial | 64/257 | 108/236 |

The mix ratio of Part A to Part B is 1:1 by volume. Table 5 shows that addition of 0.40% of 5% EDTA Na$_4$ Premix slowed down the cure significantly from initial peak exotherm time of 64 minutes without EDTA Na4 Premix to 108 minutes with EDTA Na4 Premix.

While the invention may be susceptible to various modifications and alternative forms, specific embodiments have been shown by way of example and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An adhesive formulation, comprising:
   an acrylate monomer or a methacrylate monomer, or a combination thereof;
   a chlorosulfonated polymer resin; and
   a cure profile regulator comprising a cycloheteroatom zirconate or a cycloheteroatom titannate, or a combination thereof.

2. The adhesive formulation of claim 1, comprising a reducing agent for a sulfonyl chloride group of the chlorosulfonated polymer resin.

3. The adhesive formulation of claim 1, wherein the cure profile regulator comprises cyclo[dineopentyl(diallyl)]pyrophosphatodineopentyl(diallyl) zirconate.

4. The adhesive formulation of claim 1, wherein the chlorosulfonated polymer resin comprises chlorosulfonated polyethylene.

5. The adhesive of claim 1, comprising water, a chelating agent, a toughening agent, an impact modifier, or an inhibitor/retardant, or any combination thereof.

6. The adhesive of claim 5, wherein the chelating agent comprises a premix of ethylenediaminetetraacetic acid tetra sodium salt in water and ethylene glycol.

7. The adhesive formulation of claim 5, wherein the toughening agent comprises polychloroprene, a copolymer of butadiene with styrene, or a copolymer of butadiene with isoprene, or any combination thereof.

8. The adhesive formulation of claim 5, wherein the toughening agent comprises a copolymer having a glass transition temperature of at least one domain lower than −50° C.

9. The adhesive formulation of claim 5, wherein the impact modifier comprises methacrylate butadiene styrene (MBS) copolymer.

10. The adhesive formulation of claim 5, wherein the inhibitor/retardant comprises butylated hydroxytoluene (BHT).

11. The adhesive formulation of claim 10, wherein the inhibitor/retardant comprises hydroquinone (HQ).

12. An adhesive formulation, comprising:
a an acrylate monomer or a methacrylate monomer, or a combination thereof;
a chlorosulfonated polymer;
a reducing agent for a sulfonyl chloride group of the chlorosulfonated polymer; and
wherein the peak exotherm time of the adhesive formulation varies less than 10 minutes over the shelf life of the adhesive formulation.

13. The adhesive formulation of claim 12, wherein the chlorosulfonated polymer comprises chlorosulfonated polyethylene.

14. An adhesive formulation, comprising:
an acrylate monomer or a methacrylate monomer, or a combination thereof;
a chlorosulfonated polyethylene;
a reducing agent for a sulfonyl chloride group of the chlorosulfonated polyethylene; and
a toughening-agent copolymer substantially soluble in the acrylate monomer or in the methacrylate monomer, wherein the glass transition temperature of at least one domain of the toughening-agent copolymer is less than −50° C.

15. The adhesive formulation of claim 14, wherein the toughening-agent copolymer comprises styrene-butadiene-styrene (SBS) copolymer.

16. The adhesive formulation of claim 14, wherein the toughening-agent copolymer comprises a radial type of polymer.

17. An adhesive formulation comprising:
a first part and a second part separate from the first part, wherein:
the first part comprises an acrylate monomer or a methacrylate monomer, or a combination thereof, and a chlorosulfonated polymer; and
the second part comprises a reducing agent and a cure profile regulator, wherein the cure profile regulator comprises a cycloheteroatom zirconate or a cycloheteroatom titannate, or a combination thereof.

18. The adhesive formulation of claim 17, wherein the first part comprises a carboxylic acid, or a secondary initiator, or a combination thereof.

19. The adhesive formulation of claim 18, wherein the secondary initiator comprises a peroxide.

20. The adhesive formulation of claim 17, wherein the second part comprises an accelerator.

21. The adhesive formulation of claim 20, wherein the accelerator comprises an organic transitional-metal compound.

22. The adhesive formulation of claim 17, wherein the second part comprises the acrylate monomer or the methacrylate monomer, or the combination thereof, wherein the monomer is apportioned between the first part and the second part to adjust a first viscosity of the first part and a second viscosity of the second part.

23. The adhesive formulation of claim 17, wherein the volume ratio of the first part to the second part is in the range of 10:1 to 1:2.

24. The adhesive formulation of claim 17, wherein the chlorosulfonated polymer comprises chlorosulfonated polyethylene.

* * * * *